(12) United States Patent
Snyder et al.

(10) Patent No.: US 8,576,542 B2
(45) Date of Patent: *Nov. 5, 2013

(54) STRUCTURAL ELECTROCHEMICAL CAPACITOR

(75) Inventors: James F. Snyder, Havre de Grace, MD (US); Eric D. Wetzel, Baltimore, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 154 days.

This patent is subject to a terminal disclaimer.

(21) Appl. No.: 12/956,851

(22) Filed: Nov. 30, 2010

(65) Prior Publication Data
US 2011/0164349 A1    Jul. 7, 2011

Related U.S. Application Data

(63) Continuation-in-part of application No. 11/594,862, filed on Nov. 9, 2006, now Pat. No. 7,864,505, and a continuation-in-part of application No. 11/594,863, filed on Nov. 9, 2006, now Pat. No. 7,855,017, and a continuation-in-part of application No. 11/594,861, filed on Nov. 9, 2006, now Pat. No. 8,057,938.

(60) Provisional application No. 61/265,602, filed on Dec. 1, 2009, provisional application No. 60/735,998, filed on Nov. 9, 2005, provisional application No. 60/735,999, filed on Nov. 9, 2005, provisional application No. 60/735,991, filed on Nov. 9, 2005.

(51) Int. Cl.
*H01G 9/00* (2006.01)

(52) U.S. Cl.
USPC .......................................... 361/523; 361/525

(58) Field of Classification Search
None
See application file for complete search history.

(56) References Cited

U.S. PATENT DOCUMENTS 3,649,878 A * 3/1972 Schneider .................... 361/523
4,001,656 A   1/1977 Voyles
(Continued)

FOREIGN PATENT DOCUMENTS

JP    04160705       6/1992
JP    2002-305031   10/2002

OTHER PUBLICATIONS

South et al., "Multifunctional Power-Generating and Energy-Storing Structural Composites for U.S. Army Applications" Nov. 29 to Dec. 3, 2004 (conference dates), NN 4.6.1-NN 4.6.7.

(Continued)

*Primary Examiner* — Jayprakash N Gandhi
*Assistant Examiner* — Dion Ferguson
(74) *Attorney, Agent, or Firm* — Christos S. Kyriakou

(57) ABSTRACT

A structural electrochemical capacitor that includes at least one pair of electrodes and a solid electrolytic material disposed between the electrodes which, taken collectively, have sufficient mechanical strength to allow the electrochemical capacitor to be used as a structural component of an article of manufacture is described. The present invention also describes a method of capacitively storing electrical energy and conserving mass and/or volume in a device that includes the steps of: fabricating portions of the structure of a device with high-strength structural electrochemical capacitor that includes at least one pair of electrodes and a body of solid electrolytic material disposed between said electrodes wherein the body of solid electrolytic material accounts for a majority of the mass of a structural element or a majority of the volume of a structural element in the device.

26 Claims, 3 Drawing Sheets

(56) References Cited

U.S. PATENT DOCUMENTS

| | | | |
|---|---|---|---|
| 4,535,382 | A | 8/1985 | Wada et al. |
| 5,121,301 | A | 6/1992 | Kurabayashi et al. |
| 5,168,421 | A | 12/1992 | Suzuki et al. |
| 5,176,969 | A | 1/1993 | Miyabayashi et al. |
| 5,180,645 | A | 1/1993 | More |
| 5,212,026 | A | 5/1993 | Mithcell |
| 5,230,968 | A | 7/1993 | Bones et al. |
| 5,360,686 | A | 11/1994 | Peled et al. |
| 5,478,668 | A | 12/1995 | Gozdz et al. |
| 5,567,544 | A | 10/1996 | Lyman |
| 5,793,603 | A | 8/1998 | Lyman |
| 5,898,561 | A | 4/1999 | Mandelcorn et al. |
| 6,092,269 | A | 7/2000 | Yializis et al. |
| 6,224,994 | B1 | 5/2001 | Asukabe et al. |
| 6,404,615 | B1 | 6/2002 | Wijeyesekera et al. |
| 6,981,671 | B1 | 1/2006 | Baron et al. |
| 7,057,881 | B2 | 6/2006 | Chow et al. |
| 7,486,498 | B2 | 2/2009 | Welsch et al. |
| 7,855,017 | B1 * | 12/2010 | Snyder et al. ............... 429/304 |
| 7,864,505 | B1 * | 1/2011 | O'Brien et al. ............... 361/311 |
| 2003/0169558 | A1 | 9/2003 | Olson et al. |
| 2005/0168919 | A1 | 8/2005 | Welsch et al. |
| 2006/0171100 | A1 | 8/2006 | Uematsu et al. |
| 2007/0027246 | A1 | 2/2007 | Shin et al. |

OTHER PUBLICATIONS

Luo et al., "Carbon-Fiber/Polymer Matrix Composites as Capacitors", Comp. Sci. Tech. 61, 885-888 (2001).

Thomas et al., "Mechanical Design and Performance of Composites Multifunctional Materials", Acta Mineralia 52, 2115-2164 (2004).

* cited by examiner

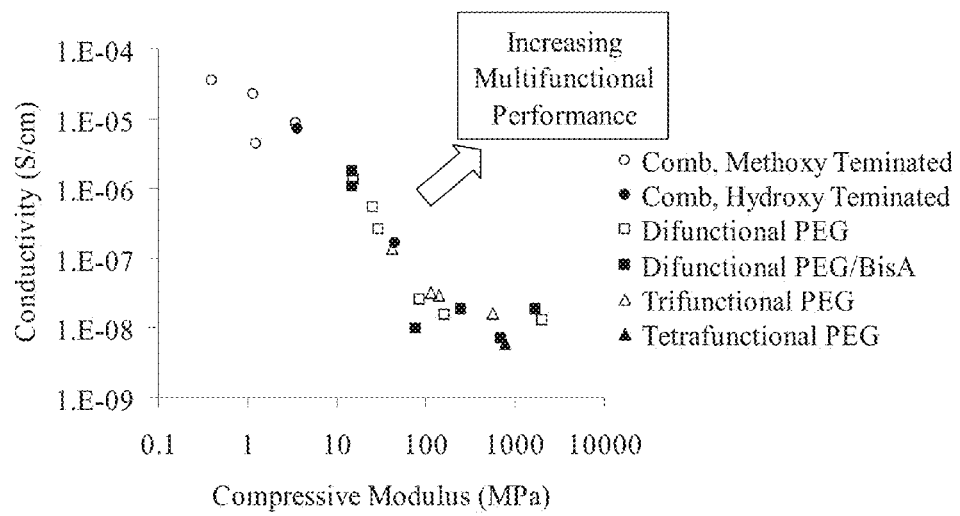
Figure 3. Room temperature ion conductivity vs. stiffness for vinyl ester homopolymer electrolytes of assorted architectures and functional groups.
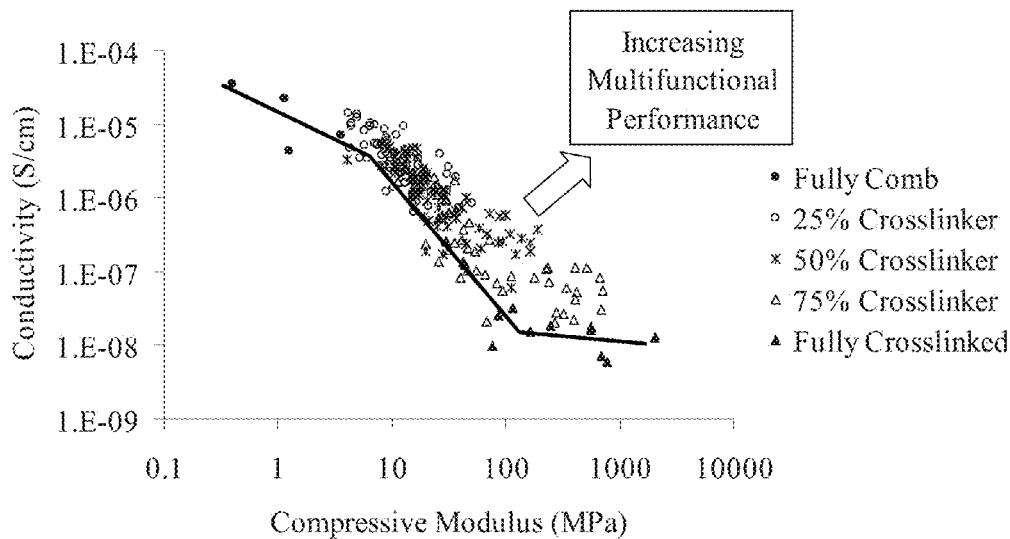
Figure 4. Room temperature ion conductivity vs. stiffness for vinyl ester copolymer electrolytes.

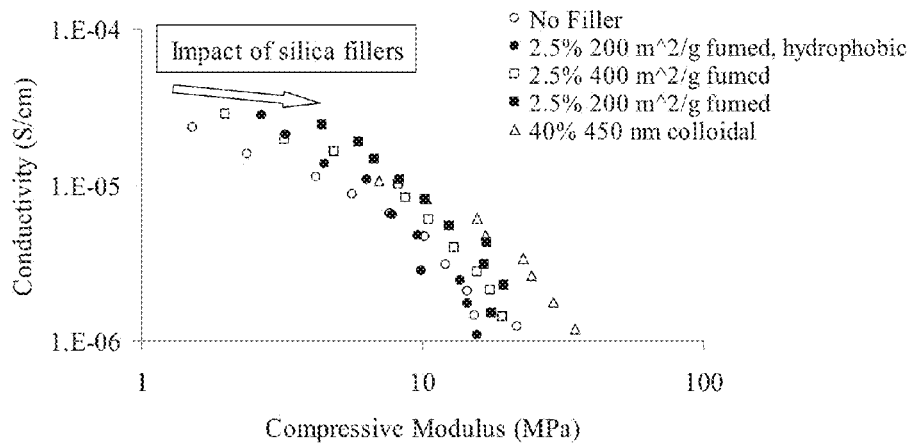

Figure 5. Room temperature ion conductivity vs. stiffness for vinyl ester copolymer electrolytes with indicated silica fillers.

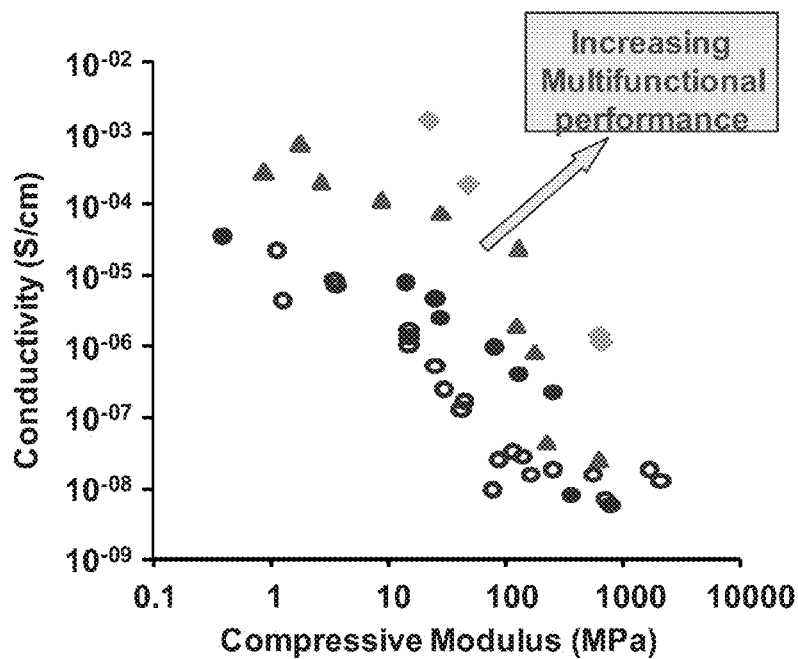

Figure 6. Room temperature ion conductivity vs. stiffness for vinyl ester copolymer electrolytes comprising homopolymers (open circle), copolymers (filled circle), vinyl ester polymer gel (filled triangle), and vinyl ester polymer gel nanocomposite (filled diamond).

STRUCTURAL ELECTROCHEMICAL CAPACITOR

RELATED APPLICATIONS

This application claims the benefit of U.S. Patent Application Ser. No. 61/265,602 filed on Dec. 1, 2009 titled "Structural Supercapacitor"; priority to U.S. patent application Ser. No. 11/594,862 filed on Nov. 9, 2006 titled "Structural Capacitors and Components Thereof" which claims the benefit of U.S. Provisional Patent Application Ser. No. 60/735,998 filed on Nov. 9, 2005 titled "Structural Capacitors"; priority to U.S. patent application Ser. No. 11/594,863 filed on Nov. 9, 2006 titled "Structural Batteries and Components Thereof" which claims the benefit of U.S. Provisional Patent Application Ser. No. 60/735,999 filed on Nov. 9, 2005 titled "Structural Composite Battery"; and priority to U.S. patent application Ser. No. 11/594,861 filed on Nov. 9, 2006 titled "Structural Fuel Cells and Components Thereof" which claims the benefit of U.S. Provisional Patent Application Ser. No. 60/735,991 filed on Nov. 9, 2005 titled "Structural Composite Fuel Cell", all of which are hereby incorporated by reference in their entireties.

GOVERNMENT INTEREST

The invention described herein may be manufactured, used, and licensed by or for the United States Government.

FIELD OF THE INVENTION

This invention relates generally to electrochemical capacitors which operate to store electrical energy. More specifically, the invention relates to electrochemical capacitors which are configured to function as structural elements of devices in which they are incorporated.

BACKGROUND OF THE INVENTION

In the design of most devices consideration is given to the final size and weight of a device. For many devices, there is a desire to minimize the size and/or weight of the device, particularly for portable electronic devices such as mobile phones and unmanned vehicles such as drones. Often the energy source for a device, e.g. a battery, a capacitor, an electrochemical capacitor, a fuel cell or a bank of such energy sources, contributes a substantial portion of the size and weight of the portable device. Thus, there it would be desirable to reduce the final size and/or weight of the energy source or bank of energy sources that is included in devices, particularly portable devices.

It has been proposed to reduce the size and weight of portable devices by making various components of such devices multifunctional. The energy source, typically a battery, is often one of the largest or heaviest single components in an electrical device and, thus, is one which would benefit most from being multifunctional. One example of multifunctionality is to add mechanical stiffness or load-carrying capacity to an energy storage device. Attempts have been made to produce multifunctional batteries which contribute to the mechanical strength of a device in which the battery is included in U.S. patent application Ser. No. 11/594,863 filed on Nov. 9, 2006 titled "Structural Batteries and Components Thereof"; in U.S. Provisional Patent Application Ser. No. 60/735,999 filed on Nov. 9, 2005 titled "Structural Composite Battery" and in "Design and Processing of Structural Composite Batteries" Proceedings of SAMPE 2007 Baltimore, Md. 3-7 Jun. 2007 by James F. Snyder et al, which is hereby incorporated by reference herein. Attempts have also been made to produce multifunctional fuel cells which contribute to the mechanical strength of the device in which the fuel cells are included in U.S. patent application Ser. No. 11/594,861 filed on Nov. 9, 2006 titled "Structural Fuel Cells and Components Thereof" and in U.S. Provisional Patent Application Ser. No. 60/735,991 filed on Nov. 9, 2005 titled "Structural Composite Fuel Cell". And, attempts have also been made to produce multifunctional capacitors which contribute to the mechanical strength of the device they supply in U.S. patent application Ser. No. 11/594,862 filed on Nov. 9, 2006 titled "Structural Capacitors and Components Thereof" and U.S. Provisional Patent Application Ser. No. 60/735,998 filed on Nov. 9, 2005 titled "Structural Capacitors". It would also be desirable to provide multifuctional electrochemical capacitors that could contribute to the mechanical strength of the device to which they supply energy to reduce the size and/or weight of the device.

Structural electrochemical capacitors would be more (or in addition to) advantageous than structural batteries, structural capacitors and structural fuel cells because electrochemical capacitors can provide higher specific power than batteries or fuel cells and higher specific energy than capacitors (c.f. Ragone plot in Figure 3 in "What Are Batteries, Fuel Cells and Supercapacitors?" Chem Rev 2004, 104, 4245-4269 by Martin Winter et al.). Electrochemical capacitors are particularly useful to provide rapid charge or discharge capabilities in combination with high specific energy devices such as batteries or fuel cells or energy harvesting devices such as photovoltaics. One useful application is for charge conditioning in which a structural electrochemical capacitor stores energy from other sources for load balancing purposes and provides an appropriate charge routine to a high specific energy device such as a battery. Structural electrochemical capacitors also have potential for long life, theoretically up to millions of charge-discharge cycles, due to the relative absence of electrode swelling and interfacial degradation in comparison to devices such as batteries that may only last for hundreds or perhaps thousands of charge-discharge cycles. Advantageously, structural electrochemical capacitors also have little danger of overcharging, a common problem batteries.

The structural energy storage devices described herein, structural electrochemical capacitors, contribute both energy storage and mechanical strength to a system or device in which the electrochemical capacitors are incorporated. The mechanical strength is owing to two factors: the design of matted or woven-laminate electrodes based for example on activated carbon fibers, and a resin or polymer electrolyte which impregnates the electrodes. The available energy density may be increased by using carbon fibers with a high surface area achieved through surface treatment or activation. Power densities greater than that obtained from batteries are realized by more rapid capacitive charge storage mechanisms such as arise from the electrical double-layer at the electrode surfaces.

Batteries, capacitors and electrochemical capacitors of the type used for delivery of relatively high levels of power or energy are generally fairly large bulky items, and their size and weight can impose a significant design constraint on systems, particularly portable systems, in which they are included. Heretofore, these size and weight constraints have limited the utility and practicality of particular systems. As will be described in detail herein below, the present invention recognizes that by the appropriate selection of materials, electrochemical capacitors may be manufactured which combine good structural properties such as strength and stiffness together with good electrical properties. Such electrochemical capacitors can be used to form structural elements of systems in which they are incorporated, and hence these electrochemical capacitors are referred to herein as "structural electrochemical capacitors." Since structural electrochemical capacitors function both as capacitive storage devices as well as structural components of systems, the weight and/or size burden imposed upon such systems by the need for capacitive storage is greatly minimized. For example, portions of the air frame of an unmanned aerial vehicle or other vehicle may be fabricated from one or more structural electrochemical capacitors. Hence, the overall weight of the vehicle will be reduced and/or the amount of electrical power carried by the vehicle can be significantly increased. It will be appreciated that similar power/weight/size benefits will be achieved with regard to other devices such as cellular telephones, other communications equipment, computers, microsystems and specialized electronic devices and systems. In such devices, the structural electrochemical capacitors of the present invention can function as circuit boards, housings, casings, protective members and so forth. Further details and advantages of the present invention will be apparent from the drawings, discussion and description which follow.

SUMMARY OF THE INVENTION

Disclosed herein is a structural electrochemical capacitor that is designed and adapted to be used as a structural element in a device in which the electrochemical capacitor is incorporated. The includes structural electrochemical capacitor at least one pair of electrodes, e.g. an anode and a cathode, and a solid electrolyte where the combined anode, cathode and solid electrolyte forms a rigid unit and the rigid unit that consists essentially of the anode, the cathode and the solid electrolyte has a compressive stiffness of at least about 10 MPa. In certain embodiments, the rigid unit that consists essentially of the anode, the cathode and the solid electrolyte has a compressive stiffness of at least 100 MPa. Desirably, the electrochemical capacitor stores and releases energy at an energy density of at least about 1 nJ/g. And in certain embodiments, the anode, the cathode and the solid electrolyte material account for a majority of the mass of the structural element or a majority of the volume of the structural element.

In one particular embodiment, the present invention provides an electrochemical capacitor used as a structural element in a device in which the electrochemical capacitor is incorporated, the electrochemical capacitor including, but not limited to: an anode, a cathode; and a solid polymer electrolyte that comprises from about 25 weight percent comb units to about 75 weight percent comb units, is a solid at room temperature, has a stiffness of at least 1 MPa and has an ionic conductivity of at least $10^{-9}$ S/cm; where the combined anode, cathode and solid electrolyte forms a rigid unit and the rigid unit that consists essentially of the anode, the cathode and the solid electrolyte collectively possesses a compressive stiffness of at least 10 MPa and a failure strength of at least 1 MPa.

The present invention also provides a method of capacitively storing electrical energy and conserving mass and/or volume in a device, the method including the steps of: fabricating portions of the structure of a device with high-strength structural electrochemical capacitor comprising at least one pair of electrodes and a body of solid electrolytic material disposed between said electrodes wherein the body of solid electrolytic material accounts for a majority of the mass of a structural element or a majority of the volume of a structural element in the device; where the combination consisting of said electrodes and said body of electrolytic material has a stiffness of at least about 10 MPa in a compression loading mode.

BRIEF DESCRIPTION OF THE DRAWINGS

FIG. 3 is a graph summarizing the ion conductivity data versus compressive stiffness data for some exemplary vinyl ester homopolymer electrolytes;

FIG. 4 is a graph summarizing the ion conductivity data versus compressive stiffness data for some exemplary vinyl ester copolymer electrolytes;

FIG. 5 is a graph summarizing the on conductivity data versus compressive stiffness data for polymer electrolytes reinforced with various nanoparticles; and FIG. 6 a graph summarizing the ion conductivity data versus compressive stiffness data for some exemplary polymer gel electrolytes and polymer gel electrolytes reinforced with nanoparticles.

DESCRIPTION OF THE PREFERRED EMBODIMENTS

Figure 1:
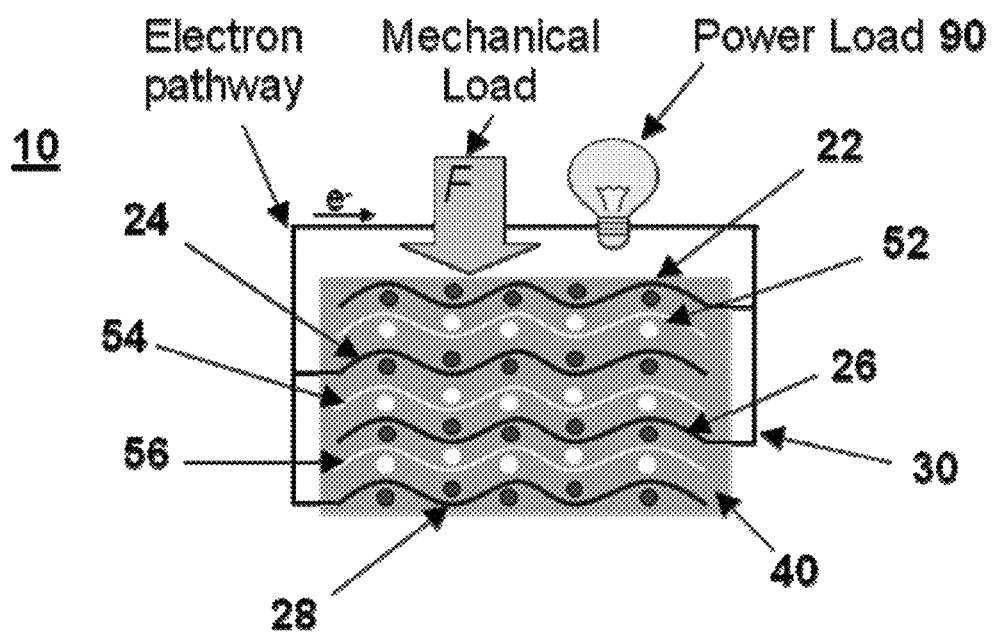
FIG. 1 is a cross-sectional view of one embodiment of structural electrochemical capacitor fabricated in accordance with one particular embodiment of the present invention.

The present invention provides structural electrochemical capacitors also sometimes referred to and include supercapacitors, ultracapacitors, electric double layer capacitors, electrochemical double layer capacitors, EDLCs, and so-called pseudocapacitors and asymmetric capacitors that rely on Faradaic processes; where the structural electrochemical capacitors include one or more active components that have sufficient strength and rigidity to allow the electrochemical capacitors to function as structural elements in various constructions and devices. As used herein the term "electrochemical capacitor" is meant to include ultracapacitors, supercapacitors and hybrid/asymmetric capacitors as described in "What Are Batteries, Fuel Cells and Supercapacitors?" Chem Rev 2004, 104, 4245-4269 by Martin Winter et al. which is hereby incorporated by reference herein.

The structural electrochemical capacitors of the present invention operate to store and release electrical energy and simultaneously function as a structural element in a device into which the structural electrochemical capacitor is incorporated and will include at least one anode, one cathode, and a body of electrolyte material disposed there between. In many embodiments, the electrolytic material is a solid and accounts for a majority of the mass and/or the volume of the structural element. The anode and cathode will both be referred to herein as "electrodes."

It is a feature of the present invention that an electrochemical capacitor of the present invention carries a structural load while simultaneously storing electrochemical energy such that the at least one pair of electrodes and the electrolytic material, taken in combination, have a stiffness which is at least about 10 MPa as measured by ASTM D-3039 ("Tensile Properties of Polymer Matrix Composites") and releases energy at an energy density of at least about 1 nJ/g. Desirably, a structural electrochemical capacitor of the present invention releases energy at an energy density of at least about 1 µJ/g and more desirably releases energy at an energy density of at least about 1 mJ/g. In specific embodiments the at least one pair of electrodes and the electrolytic material, taken in combination, have a stiffness between about 10 MPa and about 1000 GPa in a tension loading mode, a compression loading mode, a shear loading mode, a bending loading mode and/or in a torsion loading mode, and in some embodiments between about 50 MPa and about 100 GPa in a tension loading mode, a compression loading mode, a shear loading mode, a bending loading mode and/or in a torsion loading mode, as measured in accord with conventional practices well known in the engineering arts, for example ASTM D3039/D3039M-08 for tensile stiffness, ASTM D6641/D6641M-09 for compressive stiffness, ASTM D5379/D5379M-05 for shear loading stiffness, ASTM D6272-10 for bending loading stiffness and ASTM D1043-10 for torsion loading stiffness.

In addition to the foregoing, the failure strength of the combination of the at least one pair of electrodes and electrolytic material is generally at least about 1 MPa in a tension loading mode, a compression loading mode, a shear loading mode, a bending loading mode and/or in a torsion loading mode and, more desirably, at least about 10 MPa in a tension loading mode, a compression loading mode, a shear loading mode, a bending loading mode and/or in a torsion loading mode. In certain instances the failure strength of the combination of the at least one pair of electrodes and electrolytic material is between about 1 MPa and about 10 GPa, and is in some instances between about 10 MPa and about 1 GPa as measured by ASTM D3039-08. In some typical applications, the energy density of the present electrochemical capacitors is at least 1 nJ/g ($3\times10^{-10}$ Wh/kg), in other instances at least 1 µJ/g ($3\times10^{-7}$ Wh/kg), and may achieve more than 50 J/g (14 Wh/kg)) using commercially available materials utilizing the electric double layer effect and over 100 J/g for asymmetric devices incorporating Faradaic processes. In certain embodiments, the at least one pair of electrodes and the body of solid electrolytic material have a capacitance of at least 1 microFarads per gram of the electrodes and the body of solid electrolytic material. In certain embodiments, the high-strength structural electrochemical capacitor, namely the at least one pair of electrodes and said body of solid electrolytic material, have an ionic conductivity of at least $10^{-9}$ S/cm and, in particular embodiments, an ionic conductivity at least $10^{-5}$ S/cm.

The various elements of the electrochemical capacitor may differ in stiffness and failure strength; however, taken collectively, some or all contribute to the strength and integrity of the electrochemical capacitor. In specific instances, the stiffness of the electrolyte is at least about 1 MPa, and the stiffness of the at least one pair of electrodes or multiple pairs of electrodes will be also at least 1 MPa. In certain desirable embodiments, the present invention provides electrochemical capacitor materials with sufficient structural and energy efficiency so as to enable significant weight and/or volume reductions by allowing manufacturers to replace conventional, inert structural components with structural components that serve at least two functions, namely structure and energy storage.

It is to be understood that the structural electrochemical capacitors of the present invention may be fabricated utilizing various electrochemical capacitor chemistries; however, for purposes of illustration, the invention will be explained with specific reference to an exemplary electrochemical capacitor systems based on carbon electrodes and a cured vinyl ester thermoset electrolytic material that includes lithium ions and appropriate counterions, although the invention is not limited to such systems. In a lithium ion electrochemical capacitor, lithium ions move between a pair of electrodes, through a lithium ion conductive and electron resistive electrolyte during the discharge and charge cycle of the electrochemical capacitor. The appropriate counterions typically move in the opposite direction between the pair of electrodes. The charges accumulate at the boundary between the electrode and the electrolyte in what is referred to as the electrical double layer. The amount of energy that may be stored is proportional to the surface area accessible to the ions and typically depends on the topography of the electrode surface, the size and charge of the ions, the extent of dissociation between cations and anions, and the electrolyte solvent, among other things. The ions are stored at a voltage no higher than the dissociation voltage of the electrolyte solvent, which is typically less than 3V for nonaqueous media and 1V for aqueous media. It is typical for liquid solvents to be used in the electrolyte to facilitate ion transport and thus decrease internal resistance. It is also typical for electrodes to have minimal structural properties in favor of designing higher surface area. Alternative electrodes include polymers and metal oxides that can store charge by means of Faradaic processes while counterions accumulate, to result in what is referred to as pseudocapacitive devices that typically have improved energy density but often lower power density relative to standard electrochemical capacitors.

Variously configured structural electrochemical capacitors may be fabricated in accordance with the present invention. FIG. 1 depicts a cross-sectional view of one such electrochemical capacitor 10 being tested under a compressive load F while powering an electrical device, for example a light 90. The illustrated, exemplary electrochemical capacitor includes a first pair of electrodes consisting of a cathode 22 and an anode 24 and a second pair of electrodes consisting of a cathode 26 and an anode 28 which are connected via an electrical conductor 30, for example a copper wire, to form an circuit.

In certain suggested embodiments, the electrodes are formed from or otherwise include of a layer of electrically conductive carbon fabric, which can operate to accumulate ions in an electrical double layer. Suggested carbon fibers, carbon fabrics, carbon papers and other materials that may be wised as electrodes include, but are not limited to, the materials described in "Evaluation of Commercially Available Carbon Fibers, Fabrics and Papers for Potential Use in Multifunctional Energy Storage Applications" Journal of the Electrochemical Society 156 (3) A215-A224 (2009) by James F. Snyder et al. which is hereby incorporated by reference herein. A particularly suggested group of carbon fibers include, but are not limited to, polyacrylonitile-based and pitch-based fibers. Other particularly suggested carbon electrode materials include, but are not limited to, grapheme, carbon fiber mats, carbon nanotube mats and carbon nanofoam papers. In certain suggested embodiments, carbon electrodes are made from an inert or carbon-based fabric that is coated with polypyrrole. One particular carbon fabric that is particularly useful is SPECTRACARB 2225 fabric, a lightweight activated carbon fabric that is sold by Spectracorp of Shelton, Conn.

It is to be understood that electrodes of other configurations and other materials may be readily incorporated into electrochemical capacitors of this type. Such electrodes may be formed of or otherwise include surface-activated carbon fibers, carbon fibers or metal bodies having appropriate materials coated onto or absorbed there into, as well as composite materials as is known in the art. Examples of coated materials may include high surface area carbonaceous materials such as carbon nanotubes and carbon aerogels; and materials such as metal oxides and polymers that rely on Faradaic processes to store capacitive charge.

A body of a solid electrolyte material 40 is disposed so as to impregnate the pairs of electrodes. The electrolyte 40 is operable to conduct lithium ions between the opposing electrodes or a pair of electrodes, 22 and 24 and 26 and 28, respectively. Desirably, the electrodes should have at least a reasonably good lithium ion conductivity. In certain particular embodiments, the lithium ion conductivity is at least $10^{-9}$ S/cm, in other instances the lithium ion conductivity is at least $10^{-7}$ S/cm, and in particular instances the lithium ion conductivity is at least $10^{-5}$ S/cm. In the illustrated embodiment, an optional body, for example a layer of polymer material 52, 54 and 56 is disposed between adjacent electrodes. The polymer membrane acts as a separator membrane between electrodes and/or as a reinforcement for the electrolyte 15. Other electrically insulating, reinforcing fabrics can also be used as a separator membrane, such as fabrics composed of polymeric fibers including aramid (such as Kevlar®) ultrahigh molecular weight polyethylene such as Spectra®), poly p-phenylene benzobisoxazole (such as Zylon®), nylon, polyethylene, polypropylene, or combinations thereof. Other reinforcing materials such as glass fibers, mineral fibers, ceramics, polymers, and the like may also be used as a reinforcement material to enhance the strength and rigidity of the electrolyte 40. These reinforcement phases can take the form of particles, short chopped fibers, colloids, fumed particles, fumed particle clusters, and can include materials such as clays, zeolites, glasses, ceramic metal oxides, ion-conductive ceramics, and carbon-based materials such as graphite, carbon nanotubes, or fullerenes.

An electrolyte of the present invention may also be reinforced by an interpenetrating network of structural polymer. In one particular embodiment, a foamed structural polymer is formed through reaction of a dispersed foaming agent, or through a supercritical carbon dioxide process, or through removal of a scavengeable filler such as salt particles that are removed by an aqueous wash, or through selective thermal or chemical removal of a secondary polymer phase as in the case of a block copolymer or polymer blend. The void space in the foamed polymer can then be backfilled by the electrolyte. There are a variety of materials which may be employed as the electrolyte 40, and one particular group of materials which may be used in the present invention includes, but is not limited to, ion conductive, polymer electrolytes. Suggested polymer electrolytes include, but are not limited to, electrolytes described in "Electrochemical and Mechanical Behavior in Mechanically Robust Solid Polymer Electrolytes for Use in Multifunctional Structural Batteries" Chem. Mater 2007, 19, 3739-3801 by James F. Snyder et al, and in "Improving Multifunctional Behavior in Structural Electrolytes Through Copolymerization of Structure- and Conductivity-Promoting Monomers" Polymer 50 (2009) 4906-4916 by James F. Snyder et al. both of which are hereby incorporated by reference herein. In certain embodiments, the polymer electrolyte is selected from the group of polycarbonates, epoxies, polyesters, and polymers and copolymers of poly(ethylene glycol) and combinations thereof. Suggested polymer and copolymer of poly(ethylene glycol) electrolytic materials are crosslinked and, more desirably, are thermosetting polymers that are solvent free.

Figure 2:
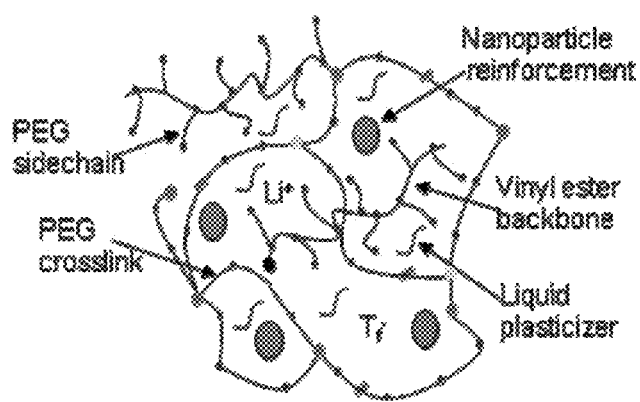
FIG. 2 is a schematic diagram of one embodiment of a structural electrolyte fabricated in accordance with an embodiment of the present invention.

The electrolyte for the structural electrochemical capacitors of the present invention should be designed to balance structural and ion conduction properties, and as such may be accomplished by controlling the structure and composition of the polymeric material itself through the use of functionalized structural polymers, block copolymers, or microscale mixtures of conductive and structural materials, as well as by introducing the ionic species either by doping a polymer host with an ionic material such as a lithium salt that may or may not have an additional liquid solvent, or by covalently affixing the ionic material directly on the polymer host to form a polyelectrolyte. Typical routes for improving polymer structural properties, such as increasing crosslink density, often lead directly to decreases in ion conductivity. However, through appropriate design, combinations of structural rigidity and ion conduction may be achieved. In some specific instances, polymer electrolytes for use in the present invention include oligo(oxyethylene) units such as polyethylene glycols (PEG). Such PEG oligomers readily dissolve lithium salts. A balance of mechanical and electrochemical properties is achieved by utilizing partially crosslinked polymer electrolyte matrices that combine linear and crosslinking resin monomers. The linear monomers will, in some embodiments, form comb polymers with freely mobile PEG side chains that facilitate ion conductivity, while the crosslinking monomers form continuous polymer networks giving mechanical strength and stiffness to the electrolyte. One suggested electrolyte is illustrated in FIG. 2. The illustrated electrolyte includes a vinyl ester backbone and PEG sidechains and PEG crosslinks and also includes optional nanoparticle reinforcement to improve mechanical properties and optional liquid electrolyte or plasticizer to improve ion conductivity. Acrylated and methacrylated monomers may be employed in some embodiments, as well as crosslinking monomers with multiple functional groups, including but not limited to difunctional, trifunctional, tetrafunctional, and pentafunctional crosslinking monomers. Suggested reinforcing materials include, but are not limited to, glass, ceramics, minerals, organic polymers, fibers of these materials and various combinations thereof.

As shown in FIG. 1, the electrochemical capacitor 10 further includes an electrical conductor 30 electrically connecting the two pairs of electrodes in an interstratified relationship to from a circuit. It is to be understood that a plurality of cells of the type shown in FIG. 1 may be electrically interconnected in a series, parallel or mixed series parallel relationship to provide appropriate voltages and currents for specific applications. Furthermore, the electrochemical capacitor 10, as well as assemblies thereof, may be further coated with, encapsulated in, or otherwise protected by an appropriate material.

The electrochemical capacitors of the present invention are rigid units, and as such are capable of functioning as structural elements in a variety of constructions. The electrochemical capacitors may be configured in a variety of cross-sectional shapes, and in various lengths. As such, the electrochemical capacitors may include hollow tubes, sheets, plates, honeycomb structures, as well as more complicated shapes. For example, the electrochemical capacitors of the present invention may be configured to form a protective casing or housing for a piece of equipment. The electrochemical capacitors may be configured as structural elements including, but not limited to, body panels of vehicles for example ground vehicles and unmanned aerial vehicles, support frames, structural beams such as structural I-beans, structural plates, structural block, structural struts, structural casings, structural housings, a protective sheathing or as components of protective devices such as helmets, ballistic armor, and so forth.

EXAMPLES

Exemplary structural electrochemical capacitor laminates were fabricated via vacuum-assisted resin transfer molding (VARTM). All of the laminates were prepared on a glass tool surface coated with FREKOTE® mold release. Each laminate consisted of two to six plies of a given fabric (T300-3k from Textile Products Inc.) separated with two plies of a polymer membrane separator (Celgard 3501). Typical cell dimensions were 4 inches by 4 inches. A structural electrolyte resin was injected into the layup under vacuum and allowed to cure at elevated temperature for at least 12 hours. The structural electrolyte was generated from 50 weight percent of tetraethylene glycol dimethacrylate and 50 weight percent of methoxy-poly(ethylene glycol)550-acrylate with bis(trifluoromethane)sulfonimide lithium salt dissolved in both monomers.

Properties of the exemplary structural electrochemical capacitors were tested. Capacitances were measured by cyclic voltammetry experiments using a Brinkmann Potentiostat-Galvanostat. Voltage was swept from −1V to +1V. At a scan rate of 2 mV/s the capacitance was measured to be 7.5 milliFarads per gram for a two-electrode (two-ply of carbon fabric) cell in which the individual electrodes had capacitances of 42 milliFarads per gram in this configuration. Tensile tests were performed using an Instron 1125 load frame with a 10,000 lb load cell on samples based on the ASTM 3039 standard. Tensile samples were 5 in.×1 in.×1/16 in. Samples were gripped one inch on each edge, resulting in a three inch gage length. Grip displacement was used to estimate the strain for each sample over the three inch gage area. Tensile modulus was measured to be 21 GPa. And, lap shear tests were performed on an Instron 1125 load frame with a 1,000 lb load cell operated at 0.05 in/min on samples based on the ASTM D5868 standard. Lap shear specimens were constructed of 1 in.×1 in.×1/16 in. panels each bonded to two 4 in.×1 in.×1/16 in. pieces of 7079 aluminum using Cytec FM94 adhesive. The bond area was 1 in.×1 in. The gripped area was tabbed with 1 in.×2 in.×1/8 in. Dess Machining fiber glass tabs bonded with FM94 adhesive. The sides of the overlap area were sanded to reduce the effect of the adhesive flash. Lap shear strength was measured to be 1.33 MPa.

A series of solid, polymer electrolytes were synthesized in accordance with the present invention. These electrolytes were prepared from monomers received from the Sartomer Company, Inc. Polyethylene glycol with a molecular weight of 550 (PEG-550) monoacrylate comb resin was used in all cases as a linear, primary ion-conducting phase. Nine difunctional and two trifunctional monomers were used as structural crosslinking components, and these systems are summarized in Table 1 herein below. Similar measurements have been performed coupling other comb resins, such as PEG-550 monomethacrylate comb resin, with the crosslinking monomers listed in Table 1.

TABLE 1

| Resin System | Abbreviation |
|---|---|
| 1 | PEG-200 (a) |
| 2 | PEG-200 (m) |
| 3 | PEG-400 (m) |
| 4 | PEG-400 (a) |
| 5 | PEG-600 (m) |
| 6 | PEG-600 (a) |
| 7 | Bis-A 15, 15 (m) |
| 8 | Bis-A 15, 15 (a) |
| 9 | Bis-A 5, 5 (a) |
| 10 | Bis-A 2, 2 (a) |
| 11 | TMP 3 (a) |
| 12 | TMP 5 (a) |

The difunctional monomers of systems 1-10 yield a single linear crosslink between polymer chains upon curing. For resin systems 1-6 this crosslink consists of a PEG group with a molecular weight of 200, 400 or 600 as detailed in Table 1. For resin systems 6-9 this crosslink consists of two equal PEG chains on either side of a bisphenol-A group where the PEG chains have either 2, 5 or 15 repeat units, as summarized in Table 1. Resin systems 11 and 12 are trifunctional with a trimethylpropane node that connects to three polymers through 1 (TMP 3) or 5 (TMP 5) units of PEG. The parenthetical notations (a) and (m) in Table 1 indicate that the monomer types were tested with acrylated (a) end groups or methacrylate (m) end groups. For each resin system, a series of samples were prepared, each sample having a different weight percentage of the comb versus crosslinking component. The proportions varied from 75% comb to 50% comb to 25% comb. Control samples were also prepared and they included 100% comb (all PEG-550) and 0% comb (no PEG-550).

Addition of nanofillers was tested to improve the mechanical and electrochemical properties of solvent-free polymer electrolytes. After preparing the monomer or comonomer solution with lithium salt, nanofiller additives were dispersed into mixtures to generate nanocomposites. The fillers that were investigated included colloidal silica and filmed silica and were varied in concentration, size, shape, and surface treatment. The polymer hosts investigated were made from comonomer solutions of PEG 550 methyl ether acrylate and PEG $(660)_2$ bisphenol-A diacrylate, which form combs and networks, respectively. These monomers were selected since they have very similar volume fractions of PEG and vinyl ester groups and the PEG oligomers are of comparable size. Since the chemical composition is similar, copolymers ranging from 0% comb to 100% comb can track changes in the matrix resulting from formation of crosslinks without complication from other variables.

Liquid electrolytes are used in commercial devices owing to their low ionic resistances. The addition of small molecule solvents to solid-state electrolytes can achieve plasticized or phase-separated systems that facilitate ion conductivity. Properly formulated this approach may be done without comparable degradation of mechanical properties. Solutions of lithium salt-doped propylene carbonate and lithium salt-doped PEG 200 were each added to structural vinyl ester resins (PEG 200 dimethacrylate) as well as structural epoxy-based resins (EPON 828, with PACM hardening agent) to form what is referred to here as polymer gels. Vinyl esters allow for facile resin injection and a wide range of architectures while epoxies provides the ability to generate partially cured components (a.k.a. pre-pregs) that can be assembled and fully cured at a later time.

Combination of nanofiller and liquid electrolyte in a polymer matrix to form polymer gel nanocomposites were also investigated in which fumed silica was added in 2.5 wt % or 5 wt % to a propylene carbonate-based gel system utilizing either epoxy-amine or vinyl ester polymer matrix.

In preparing the polymer electrolytes, all chemicals were handled in a glove box under dry nitrogen to prevent exposure to moisture. To form copolymers and nanocomposites, lithium trifluoromethanesulfonate was dissolved directly into the vinyl ester monomers at 10 weight percent (relative to mass of PEG in resin). The appropriate nanofiller was added to the monomer-salt solution. Subsequently, 1.5 weight percent (relative to total mass of resin) organic peroxide initiator (Trigonox), and 1.0 weight percent (relative to total mass of resin) dimethylaniline were added. The samples were heated in pellet-shaped silicone rubber molds at 80° C. under nitrogen for 12 hours, followed by a 100° C. post-cure treatment for 1 hour. This produced hardened pellets of the polymer electrolyte material. The pellets were painted on both sides with quick drying silver paint and further heated to 80° C. under vacuum for 12-24 hours to remove residual solvent. The final geometry of each pellet was approximately 12.3 mm in diameter by 3-4 mm thickness. To form polymer gels and polymer gel nanocomposites, 1 molar lithium trifluoromethanesulfonate solutions were prepared in both propylene carbonate and PEG 200. The appropriate amount of thus-prepared liquid electrolyte was added to the appropriate amount of vinyl ester or epoxy monomer. Fumed silica was subsequently added in polymer gel nanocomposite samples. To the vinyl ester samples 1.5 weight percent (relative to total mass of resin) organic peroxide initiator (Trigonox), and 1.0 weight percent (relative to total mass of resin) cobalt napthenate were added. The latter enabled polymerization at temperatures lower than 80° C. including room temperature. To the epoxy samples 10 weight percent (relative to total mass of resin) PACM hardening agent was added. Pellet formation and polymerization proceeded as described for copolymers and nanocomposites, although at lower cure and postcure temperatures that ranged from 20° C. to 80° C. and longer cure times that ranged from 24 hours to 96 hours.

Conductivity values for the thus-prepared pellets were calculated from data collected through impedance spectroscopy over a frequency range of 10 Hz to $10^6$ Hz at 20° C. in an environmentally controlled zero-humidity room. Uniaxial compression testing was carried out on the samples to evaluate their mechanical properties.

FIG. 3 is a graph summarizing the on conductivity data versus compressive stiffness data for homopolymer electrolytes in a chart that represents multifunctional performance. Samples that lie closer to the upper right corner of the chart have a favorable combination of properties. The values of each property span several orders of magnitude, conductivity from below $1\times10^{-8}$ S/cm to above $1\times10^{-5}$ S/cm and modulus from below 10 MPa to above 1 GPa. The data are arranged on logarithmic axes for more ready comparison. The highest conductivities are observed for comb resins with long PEG sidechains enabling ion transport. The highest moduli are observed for crosslinked resins with short crosslinks. In general, increasing comb content increases resin conductivity and decreases modulus. Longer crosslinks also increase conductivity and decrease modulus. While not wishing to be bound by speculation, the inventors hereof presume that this may be due to overall increases in polymer mobility and decreases in network density. Acrylated systems demonstrate somewhat better conductivity and lower modulus than methacrylated systems, and the presence of bis-A groups produces a slight inhibition of conductivity and increase in modulus. These results clearly illustrate that conductivity decreases as resin stiffness increases. This reflects the fact that conductivity is enhanced by polymer mobility at low crosslink density, while stiffness follows opposite trends. It is also noted that a single-part system in which both conductivity and modulus rely on the same material yields a similar tradeoff between conductivity and modulus in these systems such that no improvement in multifunctionality is evident with changes in chemistry or architecture.

FIG. 4 is a graph summarizing the ion conductivity data versus compressive stiffness data for copolymer electrolytes in a chart that represents multifunctional performance. The trend line for homopolymers is approximately traced out to provide comparison. The use of a two-part matrix in which one part favors conductivity and another part favors modulus clearly generates samples that show improved multifunctional performance versus homopolymers on these log-log axes.

FIG. 5 is a graph summarizing the on conductivity data versus compressive stiffness data for polymer nanocomposite electrolytes in a chart that represents multifunctional performance. The use of nanofillers clearly improves multifunctional performance. Low surface area colloidal silica increases modulus while decreasing conductivity, although it has a greater impact on modulus such that there is overall multifunctional improvement that is particularly evident in the low conductivity, high modulus region with substantial quantities of silica added. High surface area fumed silica interacts with the polymer more readily to increase viscosity, resulting in lower quantities of material added. The fumed silica has the greatest benefit in the high conductivity, low modulus region.

FIG. 6 a graph summarizing the ion conductivity data versus compressive stiffness data for polymer gel electrolytes and polymer gel nanocomposite electrolytes in a chart that represents multifunctional performance. The polymer gel systems are similar to copolymers in which the ion conductive comb resin has been exchanged for a liquid electrolyte. In this manner the two-part matrix is retained and both parts are optimized for individual performance. In doing so, significant improvements in multifunctional performance of over an order of magnitude were realized versus the copolymers in the low modulus region in which samples contain at least 50 weight percent liquid electrolytes. Addition of filler to form polymer gel nanocomposite electrolytes yielded additional multifunctional benefit. Conductivity was undetectable below 50 wt % liquid in epoxy-based gels and was similar to copolymers in vinyl-ester based gels. These trends may correspond to a percolation mechanism whereby the liquid must sufficiently interpenetrate the system to provide high conductivity. The vinyl ester system is conductive along the entire formulation curve since it is inherently conductive and also more likely to interact favorably with the polar liquids enabling solvent distribution.

In view of the teaching and data presented herein, one skilled in the art can formulate resins with a balanced combination of mechanical properties and ion conductivity to suit various electrochemical capacitor applications. In accordance with the present invention, it is clear that still further improvements in performance of the electrolyte will be realized by further increasing the relative performance of the electrolyte with respect to conductivity and stiffness as indicated by the arrow in FIG. 4. Optimization of individual components that support ion conductivity and stiffness, and optimized processing enabling full access to the component properties without degrading other properties, such as may occur with liquid electrolyte backfilled into structural foams, may provide improved performance. Furthermore, as mentioned above, reinforcing fibers, particles, fabrics or the like may be added to the electrolyte resin without impeding its ion transport properties, and doing so will further enhance the mechanical properties of the resin. In addition, it will be appreciated that techniques utilized for the manufacture of high strength polymeric composites can be readily adapted for use in the present invention to further strengthen the polymer matrix. Such techniques can involve the use of laminated layers of multiple materials, incorporation of reinforcing materials and so forth. In such instances, it is worth noting that for polymer matrix composites reinforced by stiff fibers, matrix properties only dominate shear and interlaminar mechanical properties while tensile properties are largely governed by fiber properties, so that through proper laminate and part design it will be possible to minimize the effect of matrix stiffness on global composite performance. In view of this teaching, one of skill in the art can readily tailor both the electronic and physical properties of the electrolyte material for particular applications.

There are a variety of techniques which may be utilized for the preparation of structural electrochemical capacitors in accordance with the present invention. In one instance, an appropriate electrolyte resin mixture may be disposed between appropriately configured electrodes and subsequently cured to produce a rigid, structural electrochemical capacitor. In particular instances, a vacuum-assisted transfer molding process may be employed wherein a vacuum or low atmospheric pressure is used to draw a resin into a space between two electrodes. In other instances, the electrochemical capacitor structures may be built up by laminating electrodes onto a previously cured body of polymeric electrode material. Lamination may be enhanced by use of heat and/or pressure and/or appropriately conductive adhesives, which adhesives may include electrolyte resin formulations. In yet other instances, an electrolyte resin formulation may be impregnated into a glass cloth or other separator structure which may then be interleaved and/or rolled together with sheets of anode and cathode material and subsequently cured. Such techniques are known and available in the art and are used in the fabrication of what is referred to as "prepreg" resin structures. Yet other techniques which are, or come to be, known in the art may be adapted for the fabrication of the electrochemical capacitor systems of this invention. It is also to be understood that while the foregoing has provided a detailed description of systems which include a solid, polymer electrolyte, structural electrochemical capacitors of the present invention may also be prepared utilizing liquid, gelled, or other nonsolid electrolytes used in combination with relatively rigid anodes and/or cathodes, provided that the requisite strength is achieved.

The longevity and performance of electrochemical capacitors are often compromised by contact with external agents, such as moisture or oxygen. Barrier materials are often incorporated into electrochemical capacitors to protect them from these external agents. These barrier agents can be directly incorporated into the present invention during initial fabrication or through secondary fabrication steps. Barrier materials could include metal foils or metalized polymer films, which could be directly bonded to the electrochemical capacitor during cure of the electrolyte matrix.

in view of the foregoing, it is to be understood that numerous modifications and variations of the present invention may be implemented by those of skill in the art. The foregoing drawings, discussion and description are illustrative of some specific embodiments, but are not meant to be a limitation upon the practice thereof. It is the following claims, including all equivalents, which define the scope of the invention.

We claim:

1. An electrochemical capacitor used as a structural element in a device into which the electrochemical capacitor is incorporated, the electrochemical capacitor comprising:
   an anode;
   a cathode; and
   a solid electrolyte;
   wherein the combined anode, cathode and solid electrolyte forms a rigid unit and the rigid unit that consists essentially of the anode, the cathode and the solid electrolyte has a compressive stiffness of at least about 10 MPa.

2. The electrochemical capacitor of claim 1, wherein the rigid unit that consists essentially of the anode, the cathode and the solid electrolyte has a compressive stiffness of at least 100 MPa.

3. The electrochemical capacitor of claim 1, wherein the electrochemical capacitor stores and releases energy at an energy density of at least about 1 nJ/g.

4. The electrochemical capacitor of claim 1, wherein the anode, the cathode and the solid electrolyte material account for a majority of the mass of the structural element or a majority of the volume of the structural element.

5. The electrochemical capacitor of claim 1, wherein the rigid unit that consists essentially of the anode, the cathode and the solid electrolyte has a failure strength of at least 1 MPa in a tension loading mode, in a compression loading mode, in a shear loading mode, in a bending loading mode or in a torsion loading mode.

6. The high-strength structural electrochemical capacitor of claim 1, wherein the rigid unit that consists essentially of the anode, the cathode and the solid electrolyte has a failure strength in the range of 10 MPa to 1 GPa in a tension loading mode, in a compression loading mode, in a shear loading mode, in a bending loading mode or in a torsion loading mode.

7. The high-strength structural electrochemical capacitor of claim 1, wherein said electrochemical capacitor is a structural beam, a structural I-beam, a structural plate, a structural block, a structural strut, a structural casing, a structural housing or a protective sheathing structure or other protective member in or on said device.

8. The high-strength structural electrochemical capacitor of claim 1, wherein said electrochemical capacitor is a structural beam, a structural I-beam, a structural block or a structural strut in said device.

9. The high-strength structural electrochemical capacitor of claim 1, comprising a plurality of pairs of anodes and cathodes, said anodes and said cathodes being disposed in an interstratified relationship with said body of solid electrolytic material being disposed there between.

10. The high-strength structural electrochemical capacitor of claim 1, wherein said body of solid electrolytic material comprises a polymer.

11. The high-strength structural electrochemical capacitor of claim 10, wherein said polymer is selected from the group consisting of polycarbonates, epoxies, polyesters, polymer and copolymers of poly(ethylene glycol) and combinations thereof.

12. The high-strength structural electrochemical capacitor of claim 10, wherein said polymer is a solvent-free, crosslinked polymer or copolymer of poly(ethylene glycol).

13. The high-strength structural electrochemical capacitor of claim 10, wherein said polymer is a thermosetting polymer.

14. The high-strength structural electrochemical capacitor of claim 1, wherein said body of solid electrolytic material includes a reinforcing material disposed therein.

15. The high-strength structural electrochemical capacitor of claim 14, wherein said reinforcing material is selected from the group consisting of glass, ceramics, minerals, organic polymers, metal oxide particles, metal oxide nanoparticles and combinations thereof.

16. The high-strength structural capacitor of claim 14, wherein said reinforcing material is present in the form of fibers and functions as a separator between a pair of adjacent electrodes.

17. The high-strength structural electrochemical capacitor of claim 1, wherein said anode and said cathode are comprised of carbon.

18. The high-strength structural electrochemical capacitor of claim 17, wherein said anode and said cathode are comprised of carbon selected from the group consisting of activated charcoal, activated carbon, graphene, carbon fibers, carbon cloths, carbon fabrics, carbon papers, carbon nanotubes, conductive polymers, carbon aerogels, amorphous carbon and combinations thereof.

19. The high-strength structural electrochemical capacitor of claim 17, wherein said anode and said cathode are comprised of carbon fibers.

20. The high-strength structural electrochemical capacitor of claim 17, wherein said carbon fibers have been treated to increase surface area, to include a coating of a metal oxide capable of Faradaically admitted capacitive charge disposed thereupon, to include a coating of a polymer capable of Faradaically admitted capacitive charge disposed thereupon, or a combination thereof.

21. The high-strength structural electrochemical capacitor of claim 1, wherein said electrodes of at least one of said at least one pair of electrodes are spaced apart by a distance in the range of 0.25 to 0.1 mm.

22. The high-strength structural electrochemical capacitor of claim 1, wherein said electrodes of at least one of said at least one pair of electrodes are spaced apart by a distance in the range of 0.001 to 50 mm.

23. The high-strength structural electrochemical capacitor of claim 1, further comprising a barrier layer designed and adapted to prevent moisture ingress into the body of solid electrolytic material.

24. The high-strength structural electrochemical capacitor of claim 1, wherein said anode, said cathode and said body of solid electrolytic material have a capacitance of at least 1 nanoFarad per gram of said anode, said cathode and said body of solid electrolytic material.

25. The high-strength structural electrochemical capacitor of claim 1, wherein said anode, said cathode and said body of solid electrolytic material have an ionic conductivity of at least $10^{-9}$ S per centimeter of electrolytic material.

26. An electrochemical capacitor used as a structural element in a device in which the electrochemical capacitor is incorporated, the electrochemical capacitor comprising:

an anode;

a cathode; and a solid polymer electrolyte that comprises from about 25 weight percent comb units to about 75 weight percent comb units, is a solid at room temperature, has a stiffness of at least 1 MPa and has an ionic conductivity of at least $10^{-9}$ S/cm;

wherein the combined anode, cathode and solid electrolyte forms a rigid unit and the rigid unit that consists essentially of the anode, the cathode and the solid electrolyte collectively possesses a compressive stiffness of at least 10 MPa and a failure strength of at least 1 MPa.

* * * * *